(12) United States Patent
Park

(10) Patent No.: US 10,949,161 B2
(45) Date of Patent: Mar. 16, 2021

(54) METHOD FOR PERFORMING MULTI-TASKING USING EXTERNAL DISPLAY DEVICE AND ELECTRONIC DEVICE THEREOF

(71) Applicant: Samsung Electronics Co., Ltd., Suwon-si (KR)

(72) Inventor: Dong-Joon Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/694,111

(22) Filed: Nov. 25, 2019

(65) Prior Publication Data
US 2020/0089463 A1 Mar. 19, 2020

Related U.S. Application Data

(63) Continuation of application No. 15/948,254, filed on Apr. 9, 2018, now Pat. No. 10,489,102, which is a (Continued)

(30) Foreign Application Priority Data

May 23, 2013 (KR) .......................... 10-2013-0058453

(51) Int. Cl.
*G06F 9/44* (2018.01)
*G06F 3/14* (2006.01)
(Continued)

(52) U.S. Cl.
CPC ............ *G06F 3/1462* (2013.01); *G06F 9/455* (2013.01); *G06F 9/54* (2013.01); *G06F 13/105* (2013.01); *G09G 2340/02* (2013.01)

(58) Field of Classification Search
CPC .................................................. G06F 3/1462
(Continued)

(56) References Cited

U.S. PATENT DOCUMENTS

2007/0136466 A1 6/2007 Etelapera
2011/0112819 A1* 5/2011 Shirai ................. G06F 9/45537
703/21
(Continued)

FOREIGN PATENT DOCUMENTS

KR 10-2005-0119037 A 12/2005
KR 10-2007-0017011 A 2/2007
(Continued)

OTHER PUBLICATIONS

Korean Notice of Patent Grant dated Dec. 17, 2019, issued in Korean Application No. 10-2013-0058453.
(Continued)

*Primary Examiner* — Timothy A Mudrick
(74) *Attorney, Agent, or Firm* — Jefferson IP Law, LLP

(57) ABSTRACT

A method and apparatus for performing multi-tasking using an external display device in an electronic device are provided. A method for performing a multi-tasking work using an external display device in an electronic device includes the operations of executing at least one application, determining whether to output an application screen to the external display device, in response to determining to output the application screen, sending an emulator execution request to the external display device, and, after sending the emulator execution request to the external display device, determining an application identifier in a screen of an application whose screen is determined to be outputted to the external display device, and transmitting a signal corresponding to the screen and the application identifier to the external display device.

20 Claims, 8 Drawing Sheets

Related U.S. Application Data continuation of application No. 14/282,285, filed on May 20, 2014, now Pat. No. 9,940,088.

(51) Int. Cl.
  *G06F 13/10* (2006.01)
  *G06F 9/54* (2006.01)
  *G06F 9/455* (2018.01)

(58) Field of Classification Search
  USPC ......................................................... 719/310
  See application file for complete search history.

(56) References Cited

U.S. PATENT DOCUMENTS

| | | |
|---|---|---|
| 2011/0275391 A1 | 11/2011 | Lee et al. |
| 2012/0021682 A1 | 1/2012 | Tabaaloute |
| 2012/0226994 A1 | 9/2012 | Lee |
| 2014/0075377 A1* | 3/2014 | Kang ................ H04M 1/72527 715/788 |
| 2014/0164520 A1* | 6/2014 | Fan ..................... H04L 67/1095 709/204 |

FOREIGN PATENT DOCUMENTS

| | | |
|---|---|---|
| KR | 10-2011-0085334 A | 7/2011 |
| KR | 10-2011-0123348 A | 11/2011 |
| KR | 10-2012-0100045 A | 9/2012 |

OTHER PUBLICATIONS

Korean Office Action dated Apr. 17, 2019, issued in Korean Application No. 10-2013-0058453.
Korean Office Action dated Sep. 24, 2019, issued in Korean Application No. 10-2013-0058453.

* cited by examiner

METHOD FOR PERFORMING MULTI-TASKING USING EXTERNAL DISPLAY DEVICE AND ELECTRONIC DEVICE THEREOF

CROSS-REFERENCE TO RELATED APPLICATION(S)

This application is a continuation application of prior application Ser. No. 15/948,254, filed on Apr. 9, 2018, which is a continuation application of prior application Ser. No. 14/282,285, filed on May 20, 2014, which has issued as U.S. Pat. No. 9,940,088 on Apr. 10, 2018 and was based on and claimed priority under 35 U.S.C § 119(a) of a Korean patent application number 10-2013-0058453, filed on May 23, 2013, in the Korean Intellectual Property Office, the disclosure of which is incorporated by reference herein in its entirety.

TECHNICAL FIELD

The present disclosure relates to a technique of performing multi-tasking using an external display device in an electronic device.

BACKGROUND

Mostly, electronic devices such as mobile phones and smart phones support multi-tasking capable of concurrently running two or more applications at one time. For example, while otherwise performing other operations, the electronic device can convert into a calendar application in order to view appointments or convert into an address book application in order to view contacts. While the electronic device plays multimedia data such as video or Moving Picture Experts Group (MPEG) Audio layer 3 (MP3), the electronic device can convert into a message application and respond to a message. However, as a result of the limitation of a display size of the electronic device such as the mobile phone and the smart phone, the electronic device has to convert one application screen into other application screen or display two application screens through screen split in order to perform multi-tasking.

Therefore, there are limitations in doing a multi-tasking work in the electronic device, because of requirements associated with portability of electronic devices, the electronic device has a display smaller than a monitor of a Personal Computer (PC).

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for performing multi-tasking using an external display device in an electronic device.

Another aspect of the present disclosure is to provide a method and apparatus for using a plurality of applications of an electronic device in an external display device.

Another aspect of the present disclosure is to provide a method and apparatus for using a plurality of applications of an electronic device in an external display device in order to perform convenient multi-tasking in the electronic device.

In accordance with an aspect of the present disclosure, a method for performing a multi-tasking work using an external display device in an electronic device is provided. The method includes the operations of executing at least one application, determining whether to output an application screen to the external display device, for the at least one application, in response to determining to output the application screen to the external display device, sending an emulator execution request to the external display device, and, after sending the emulator execution request to the external display device, determining an application identifier for a screen of an application whose screen is determined to be outputted to the external display device among the at least one application and transmitting a signal corresponding to the screen and the application identifier to the external display device.

In accordance with another aspect of the present disclosure, the method further includes the operations of receiving at least one of an input signal and a control signal for a specific application, from the external display device, and processing the at least one the input signal and the control signal using the specific application.

In accordance with another aspect of the present disclosure, the method further includes the operation of transmitting an application identifier together with a screen of the processed specific application, to the external display device.

In accordance with another aspect of the present disclosure, the method further includes the operation of, when outputting a screen of a specific application to the external display device is ended, stopping outputting the screen of the specific application to the external display device.

In accordance with another aspect of the present disclosure, the operation of stopping outputting the screen of the specific application to the external display device includes the operations of sending a request for emulator execution stop for the specific application to the external display device, and displaying the screen of the specific application in the electronic device.

In accordance with another aspect of the present disclosure, the screen of the application whose screen is determined to be outputted to the external display device is not displayed in the electronic device, and a screen of an application whose screen is not determined to be outputted to the external display device is displayed in the electronic device.

In accordance with another aspect of the present disclosure, the method further includes transmitting to the external display device an audio related to the application whose screen is determined to be outputted to the external display device among the at least one application.

In accordance with an aspect of the present disclosure, a method for controlling an application of an electronic device in an external display device is provided. The method includes the operations of receiving a request for emulator execution for displaying a plurality of applications executed in the electronic device, from the electronic device, executing an emulator, receiving signals corresponding to screens of the plurality of applications executed in the electronic device, from the electronic device, and displaying, in at least one screen, the screens of the plurality of applications executed in the electronic device, through the emulator.

In accordance with another aspect of the present disclosure, the method further includes the operations of receiving at least one of an input signal and a control signal for a specific application, from an input device connected to the external display device, and forwarding the at least one of the input signal and the control signal for the specific application, to the electronic device.

In accordance with another aspect of the present disclosure, the method further includes the operation of receiving a screen of the specific application corresponding to the at least one of the input signal and the control signal, from the electronic device.

In accordance with another aspect of the present disclosure, the plurality of applications executed in the electronic device are distinguished by application identifiers.

In accordance with another aspect of the present disclosure, a screen of an application whose screen is determined to be outputted to the external display device is not displayed in the electronic device, and a screen of an application whose screen is not determined to be outputted to the external display device is displayed in the electronic device.

In accordance with another aspect of the present disclosure, the method further includes receiving an audio related to the plurality of applications executed in the electronic device, from the electronic device.

In accordance with an aspect of the present disclosure, an electronic device includes one or more processors, a memory, and one or more programs stored in the memory and configured to be executed by the one or more processors is provided. The program includes an instruction of executing at least one application, determining whether to output an application screen to the external display device, for the at least one application, in response to determining to output the application screen to the external display device, sending an emulator execution request to the external display device, and, after sending the emulator execution request to the external display device, determining an application identifier for a screen of an application whose screen is determined to be outputted to the external display device among the at least one application, and transmitting a signal corresponding to the screen and the application identifier to the external display device.

In accordance with another aspect of the present disclosure, the program further includes an instruction of receiving at least one of an input signal and a control signal for a specific application, from the external display device, and processing the at least one the input signal and the control signal using the specific application.

In accordance with another aspect of the present disclosure, the program further includes an instruction of transmitting an application identifier together with a screen of the processed specific application, to the external display device.

In accordance with another aspect of the present disclosure, the program further includes an instruction of, when outputting a screen of a specific application to the external display device is ended, stopping outputting the screen of the specific application to the external display device.

In accordance with another aspect of the present disclosure, the instruction of stopping outputting the screen of the specific application to the external display device includes an instruction of sending a request for emulator execution stop for the specific application to the external display device, and displaying the screen of the specific application in the electronic device.

In accordance with another aspect of the present disclosure, the screen of the application whose screen is determined to be outputted to the external display device is not displayed in the electronic device, and a screen of an application whose screen is not determined to be outputted to the external display device is displayed in the electronic device.

In accordance with another aspect of the present disclosure, the program further includes an instruction of transmitting to the external display device an audio related to the application whose screen is determined to be outputted to the external display device among the at least one application.

In accordance with an aspect of the present disclosure, an external display device for controlling an application of an electronic device is provided. The electronic device includes a control unit configured to receive a request for emulator execution for displaying a plurality of applications executed in the electronic device, from the electronic device, to execute an emulator and to receive signals corresponding to screens of the plurality of applications executed in the electronic device, from the electronic device, and a display unit configured to display in one screen the screens of the plurality of applications executed in the electronic device, through the emulator.

In accordance with another aspect of the present disclosure, the control unit is configured to receive at least one of an input signal and a control signal for a specific application, from an input device connected to the external display device, and to forward the at least one of the input signal and the control signal for the specific application, to the electronic device.

In accordance with another aspect of the present disclosure, the control unit is configured to receive a screen of the specific application corresponding to at least one of the input signal and the control signal, from the electronic device.

In accordance with another aspect of the present disclosure, the plurality of applications executed in the electronic device are distinguished by application identifiers.

In accordance with another aspect of the present disclosure, a screen of an application whose screen is determined to be outputted to the external display device is not displayed in the electronic device, and a screen of an application whose screen is not determined to be outputted to the external display device is displayed in the electronic device.

In accordance with another aspect of the present disclosure, the control unit is configured to receive an audio related to the plurality of applications executed in the electronic device, from the electronic device.

In accordance with an aspect of the present disclosure, a system for performing a multi-tasking work using an external display device in an electronic device is provided. The system includes the electronic device configured to output from the external display device screens or audios of a plurality of applications, comprising application identifiers in the screens or audios, executed in the electronic device, to send an emulator execution request to the external display device, and to transmit the screens or audios including the application identifiers to the external display device, and the external display device configured to receive, from the electronic device a request for emulator execution for outputting from the external display device the screens or audios of the plurality of applications executed in the electronic device, to execute an emulator, to receive the screens or audios from the electronic device, and to display in one screen the screens of the plurality of applications executed in the electronic device, through the emulator, and to output audio signals of the plurality of applications executed in the electronic device.

In accordance with another aspect of the present disclosure, the electronic device is configured to receive at least one of an input signal and a control signal for a specific application, from the external display device, and to process the at least one of the input signal and the control signal using the specific application.

In accordance with another aspect of the present disclosure, the electronic device is configured to transmit an application identifier together with a screen of the processed specific application, to the external display device.

In accordance with another aspect of the present disclosure, the external display device is configured to receive at least one of an input signal and a control signal for a specific application, from an input device connected to the external display device, and to forward the at least one of the input signal and the control signal for the specific application, to the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will become more apparent from the following description when taken in conjunction with the accompanying drawings, in which.

Throughout the drawings, like reference numerals will be understood to refer to like parts, components, and structures.

DETAILED DESCRIPTION

Figure 1:
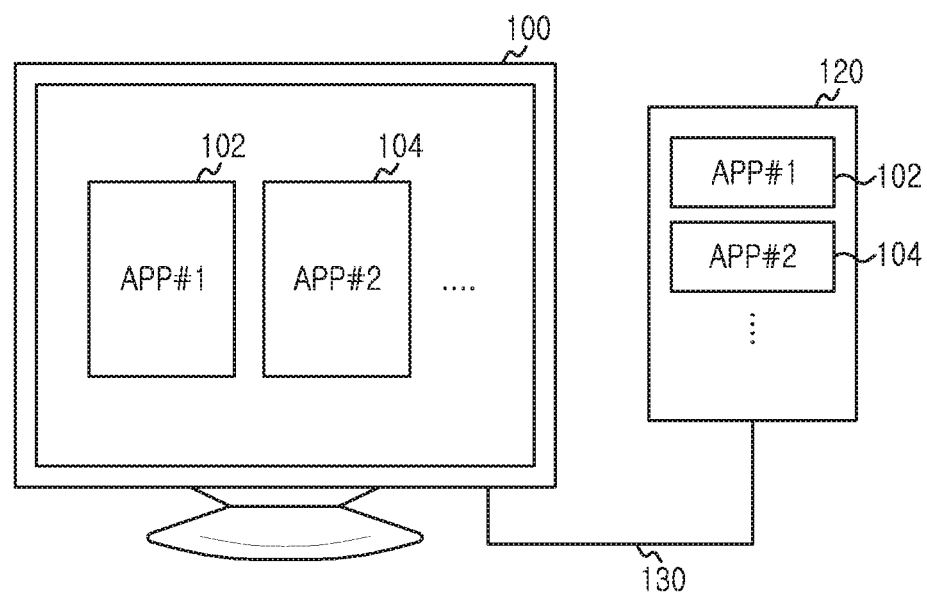
FIG. 1 is a diagram illustrating a construction of a system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Below, an embodiment of the present disclosure describes a method and apparatus for performing multi-tasking using an external display device in an electronic device. Particularly, the embodiment relates to a method and apparatus for executing a plurality of applications in the electronic device and outputting screens of the plurality of applications to the external display device and, when receiving an input or control signal from the external display device, performing processing corresponding to the input or control signal using a corresponding application among the plurality of applications.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, the external display device may be an electronic device. For example, the external display device may be a display device such as a smart Television (TV), a monitor of a computer, and/or the like.

FIG. 1 illustrates a construction of a system according to an embodiment of the present disclosure.

Referring to FIG. 1, the system according to various embodiments of the present disclosure includes an external display device 100, an electronic device 120, and an interface 130.

The external display device 100 may perform a function of displaying signals corresponding to screens of a plurality of applications 102 and 104 which are received from the electronic device 120 through the interface 130. In addition, the external display device 100 may provide an input signal or control signal of a corresponding application which is generated to the electronic device 120 through the interface 130. The input signal or control signal of the corresponding application may be generated through an input means such as a touch input, a keyboard, a mouse, a remote controller, and/or the like. The external display device 100 may further include an audio output module such as a speaker and/or the like, and output even an audio signal received from the electronic device 120.

The interface 130 provides connection (e.g., direct connection) through a cable, or provides connection between the external display device 100 and the electronic device 120 through wired Internet, or provides a wireless connection between the external display device 100 and the electronic device 120. The wireless connection may connect the external display device 100 and the electronic device 120 through a short-range wireless communication such as a Wireless Local Area Network (WLAN), an Infrared Data Association (IrDA), Bluetooth, WiFi Direct, and/or the like.

When an external display device view mode according to an embodiment of the present disclosure is executed, the electronic device 120 transmits a corresponding application screen signal of the electronic device 120 to the external display device 100 such that the external display device 100 displays an application screen of the electronic device 120 in response to the execution of the external display device view mode. At this time, the application screen selecting the external display device view mode may not be displayed in the electronic device 120. For example, the application screen displayed in the external display device 100 is not displayed in the electronic device 120, and an application screen not selecting the external display device view mode may be displayed in the electronic device 120.

According to various embodiments of the present disclosure, the application screen selecting the external display device view mode may be concurrently displayed in the electronic device 120 as well as the external display device 100.

Figure 2:
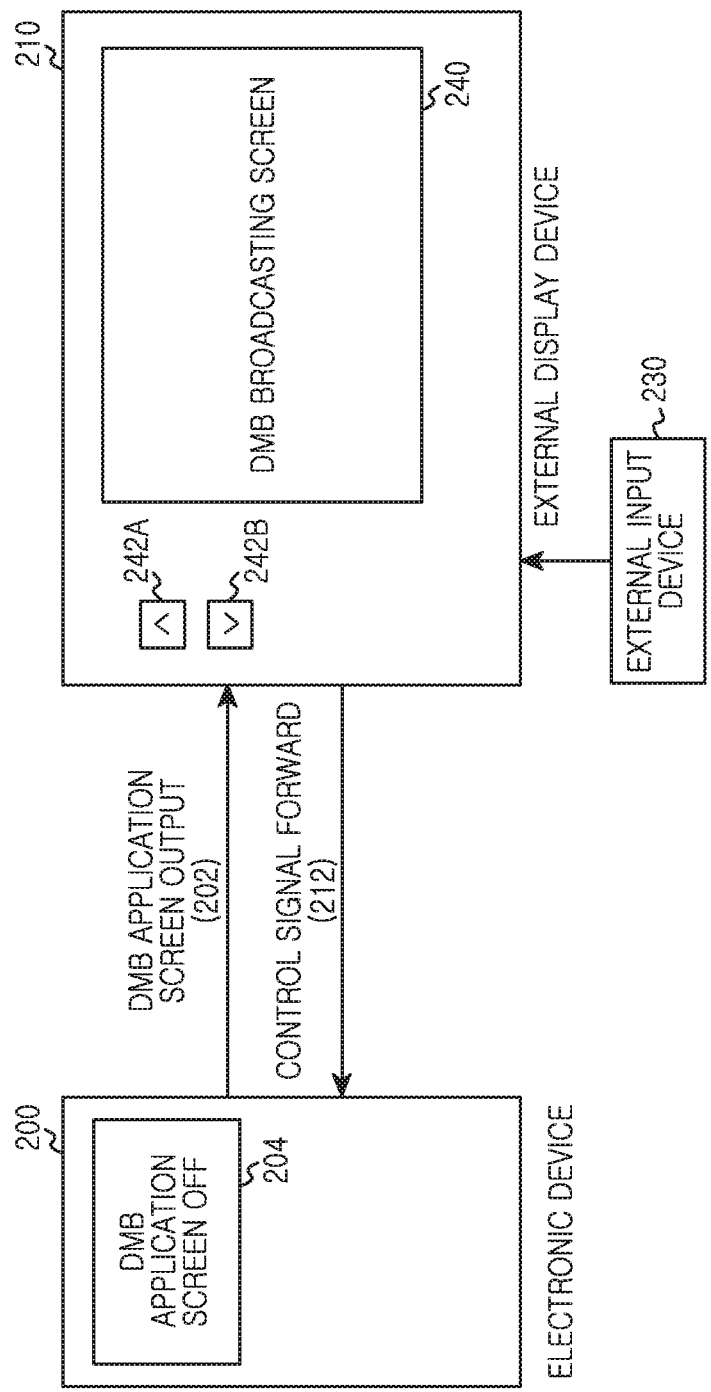
FIG. 2 is a diagram illustrating a procedure of using in an external display device a plurality of applications of an electronic device according to an embodiment of the present disclosure.

FIG. 2 is a diagram illustrating a procedure of using in an external display device a plurality of applications of an electronic device according to an embodiment of the present disclosure.

Referring to FIG. 2, an electronic device 200 may be connected with an external display device 210. When the electronic device 200 executes a Digital Multimedia Broadcasting (DMB) application and an external display device view mode is selected for the DMB application, an output signal 202 corresponding to a DMB application screen of the electronic device 200 may be provided to the external display device 210. According to various embodiments of the present disclosure, the DMB application screen 204 may not be displayed in the electronic device 200. However, a specific application (e.g., a telephony application) not selecting the external display device view mode may be executed and displayed in the electronic device 200.

According to various embodiments of the present disclosure, the output signal 202 corresponding to the DMB application screen of the electronic device 200 may be compressed according to a corresponding image compression algorithm and may be provided to the external display device 210.

The external display device 210 decompresses the output signal 202 corresponding to the DMB application screen received from the electronic device 200 and provides the output signal 202 to an emulator that exists in a hardware structure or software structure within the external display device 210. The emulator of the external display device 210 displays the output signal 202 corresponding to the DMB application screen 240 received from the electronic device 200, on a screen of the external display device 210.

In contrast, when an input or control signal 212 for the DMB application displayed through the emulator of the external display device 210 is generated through an input device 230 (e.g., a keyboard, a mouse, a remote controller, etc.) of the external display device 210 instead of the electronic device 200, the external display device 210 provides the input or control signal 212 for the DMB application to the electronic device 200. The electronic device 200 may perform processing corresponding to the input or control signal 212 through the DMB application, and may provide an output signal corresponding to the resultant screen, to the external display device 210.

For example, when the DMB application screen of the electronic device 200 is displayed through the external display device 210, a DMB channel change event may occur according to selection of channel change button 242A or 242B using the input device 230 (e.g., a mouse of the external display device 210). For example, the external display device 210 may receive the signal 212 controlling the DMB application through the input device 230 (e.g., the mouse, the keyboard, and/or the like), and may provide the control signal 212 to the electronic device 200. Thereafter, the electronic device 200 performs processing. For example, the electronic device 200 may perform a channel change corresponding to the control signal 212 received from the external display device 210. The electronic device 200 may provide the resultant screen to the external display device 210.

Figure 3:
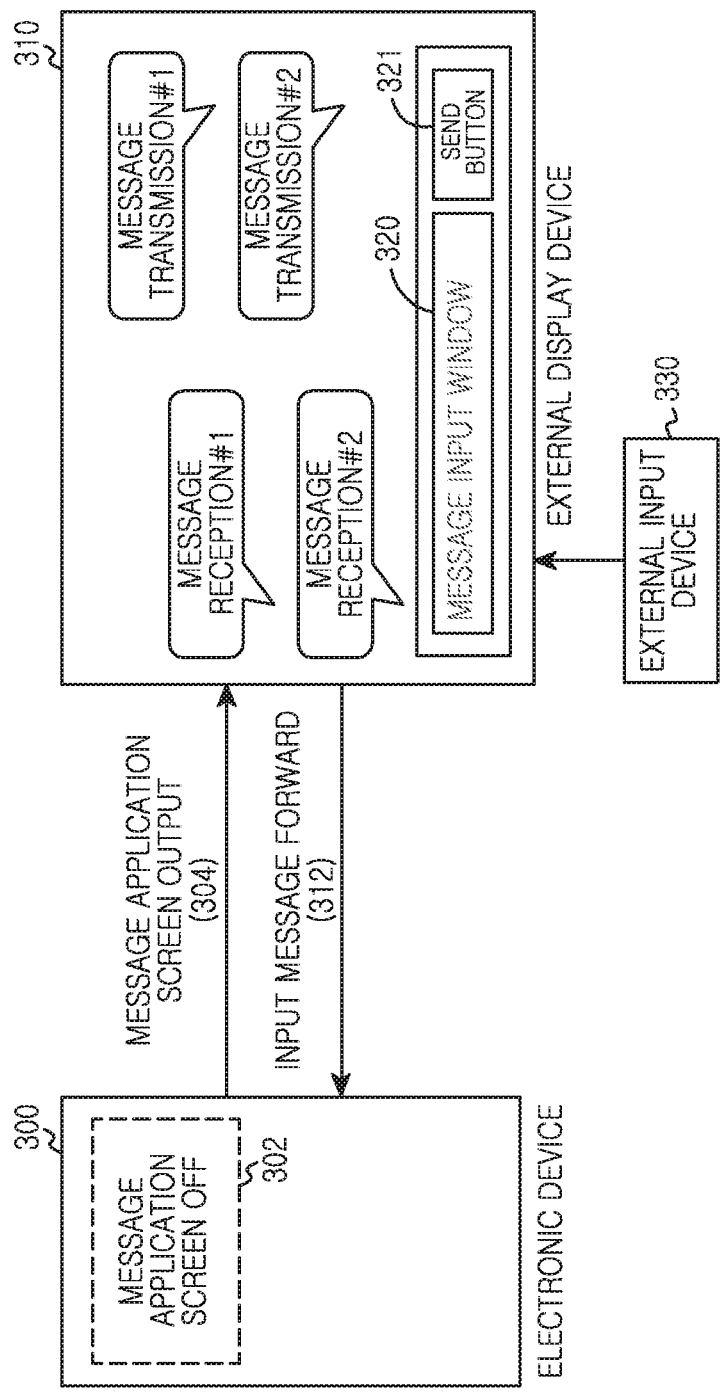
FIG. 3 is a diagram illustrating a procedure of using in an external display device a plurality of applications of an electronic device according to an embodiment of the present disclosure.

FIG. 3 is a diagram illustrating a procedure of using in an external display device a plurality of applications of an electronic device according to an embodiment of the present disclosure.

Referring to FIG. 3, an electronic device 300 is connected to an external display device 310. When the electronic device 300 executes a message application and an external display device view mode is selected for the message application, an output signal 304 corresponding to a message application screen of the electronic device 300 may be provided to an external display device 310. The message application screen 302 may not be displayed in the electronic device 300. However, a specific application not selecting the external display device view mode may be executed and displayed in the electronic device 300. According to various embodiments of the present disclosure, a message application screen 302 may or may not be displayed according to user selection or according to various settings of the electronic device and/or application.

According to various embodiments of the present disclosure, the output signal 304 corresponding to the message application screen of the electronic device 300 may be compressed according to a corresponding image compression algorithm and may be provided to the external display device 310.

The external display device 310 decompresses the output signal 304 corresponding to the message application screen received from the electronic device 300 and provides the output signal 304 to an emulator that exists in a hardware structure or software structure within the external display device 310. The emulator of the external display device 310 displays the output signal 304 corresponding to the message application screen received from the electronic device 300, on a screen of the external display device 310.

In contrast, when an input or control signal 312 for the message application displayed through the emulator of the external display device 310 is generated through an input device 330 (e.g., a keyboard, a mouse, a remote controller, etc.) of the external display device 310 instead of the electronic device 300, the external display device 310 provides the input or control signal 312 for the message application to the electronic device 300. The electronic device 300 may perform processing corresponding to the input or control signal 312 through the message application, and may provide an output signal corresponding to the resultant screen, to the external display device 310.

For example, when the message application screen of the electronic device 300 is displayed through the external display device 310, a message input and a control signal corresponding to a transmission instruction may be generated according to an input using the input device 330 (e.g., a keyboard of the external display device 310). For example, after a message is input to a message input window 320 of the message application through the input device 330 (e.g., the mouse, the keyboard, and/or the like) in the external display device 310, when a send button 321 is selected, the external display device 310 may provide the input message and the control signal corresponding to the transmission instruction, to the electronic device 300.

According to various embodiments of the present disclosure, the electronic device 300 may perform processing corresponding to the input message and the control signal received from the external display device 310. For example, the electronic device 200 may transmit the inputted message to a counterpart electronic device and may provide the resultant screen to the external display device 310. According to various embodiments of the present disclosure, when the electronic device 300 receives a message from the counterpart electronic device, the message application may provide the message reception result to the external display device 310.

Figure 4:
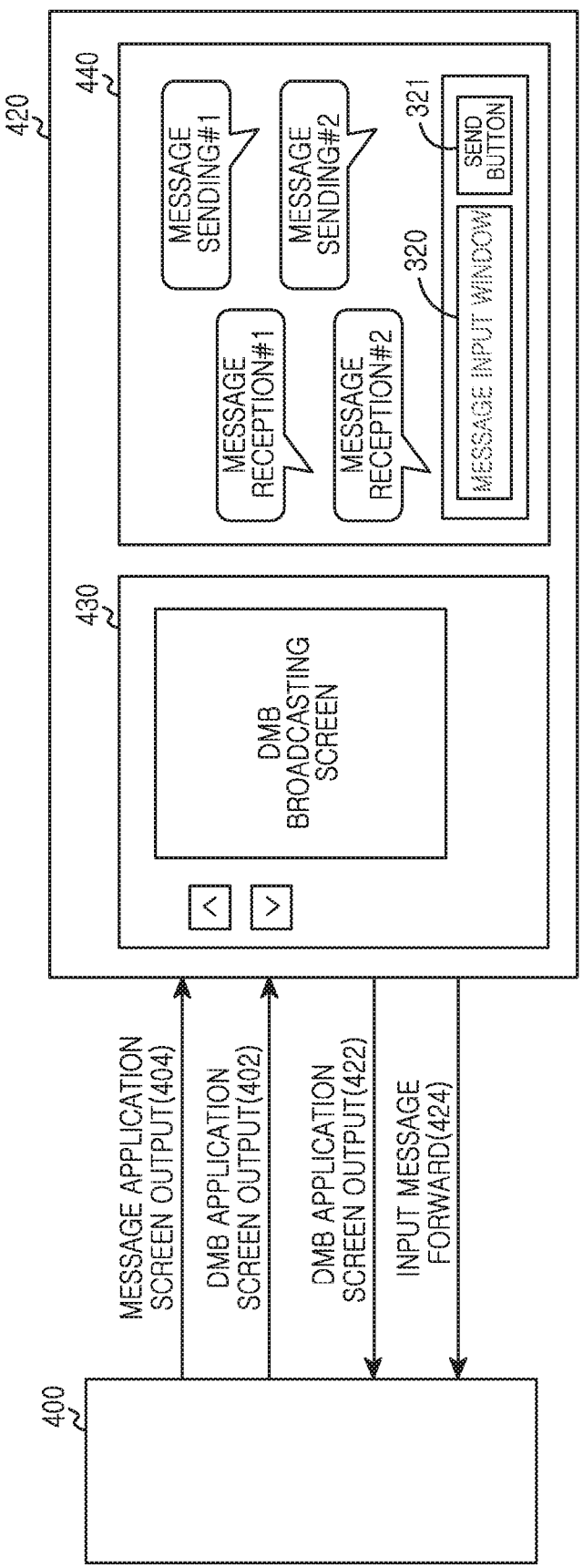
FIG. 4 is a diagram illustrating a procedure of performing multi-tasking using an external display device in an electronic device according to an embodiment of the present disclosure.

FIG. 4 is a diagram illustrating a procedure of performing multi-tasking using an external display device in an electronic device according to an embodiment of the present disclosure.

Referring to FIG. 4, an electronic device 400 may be connected to an external display device 420. When the electronic device 400 executes a DMB application and a message application, and when an external display device view mode is selected for each of the DMB application and the message application, the electronic device 400 sends output signals 402 and 404 respectively corresponding to a DMB application screen and a message application screen of the electronic device 400. Each of the output signals 402 and 404 may be provided to an external display device 420. According to various embodiments of the present disclosure, the DMB application screen and/or the message application screen may not be displayed in the electronic device 400. However, a specific application not selecting the external display device view mode may be executed and displayed in the electronic device 400. According to various embodiments of the present disclosure, the DMB application screen and/or the message application screen may or may not be displayed according to user selection or according to various settings of the electronic device and/or application.

According to various embodiments of the present disclosure, because screens of a plurality of applications are provided from the electronic device 400 to the external display device 420, output signals may further include identifiers capable of identifying the applications in the external display device 420.

According to various embodiments of the present disclosure, the output signals 402 and 404 corresponding to the DMB application screen and the message application screen of the electronic device 400 may be compressed according to a corresponding image compression algorithm and be provided to the external display device 420.

According to various embodiments of the present disclosure, the external display device 420 decompresses the output signals 402 and 404 corresponding to the DMB application screen 430 and the message application screen 440 received from the electronic device 400 and provides the output signals 402 and 404 to an emulator that exists in a hardware structure or software structure within the external display device 420. The emulator of the external display device 420 displays the output signals 402 and 404 corresponding to the DMB application screen 430 and the message application screen 440 received from the electronic device 400, on one screen of the external display device 420.

When an input or control signal 422 or 424 for the DMB application or the message application displayed through the emulator of the external display device 420 is generated through an input device (e.g., a keyboard, a mouse, a remote controller, and/or the like) of the external display device 420 instead of the electronic device 400, the external display device 420 provides the input or control signal 422 or 424 for the DMB application or the message application to the electronic device 400. The electronic device 400 may perform processing corresponding to the input or control signal 422 or 424 through the DMB application or the message application, and provide an output signal corresponding to the resultant screen, to the external display device 420.

For example, when the DMB application screen of the electronic device 400 is displayed through the external display device 420, a DMB channel change event may occur through the input device (e.g., a mouse, and/or the like of the external display device 420). For example, the external display device 420 may receive the signal 422 controlling the DMB application through the input device (e.g., the mouse, the keyboard, and/or the like), and may provide the control signal 422 to the electronic device 400. Thereafter, the electronic device 400 performs processing. For example, the electronic device 400 may perform a channel change corresponding to the control signal 422 received from the external display device 420. The electronic device 400 may provide the resultant screen to the external display device 420.

In addition, when the message application screen of the electronic device 400 is displayed through the external display device 420, a message input and a control signal corresponding to a transmission instruction may be generated through the input device (e.g., a keyboard of the external display device 420). For example, after a message is inputted to a message input window 320 of the message application through the input device (e.g., the mouse, the keyboard, and/or the like) in the external display device 420, when a send button 321 is selected, the external display device 420 may provide the input message and the control signal 424 corresponding to the transmission instruction, to the electronic device 400.

The electronic device 400 may perform processing corresponding to the input message and the control signal 422 received from the external display device 420. For example, the electronic device 400 may transmit the inputted message to a counterpart electronic device and may provide the resultant screen to the external display device 420. In contrast, when the electronic device 400 receives a message from the counterpart electronic device, the message application may provide the message reception result to the external display device 420.

According to various embodiments of the present disclosure, the external display device 420 displays a plurality of applications executed in the electronic device 400, and controls the plurality of applications executed in the electronic device 400 through the input device (not shown) connected to the external display device 420. As a result, various embodiments of the present disclosure are able to decrease an inconvenience of a multi-tasking work caused by a small screen of the electronic device 400.

Figure 5:
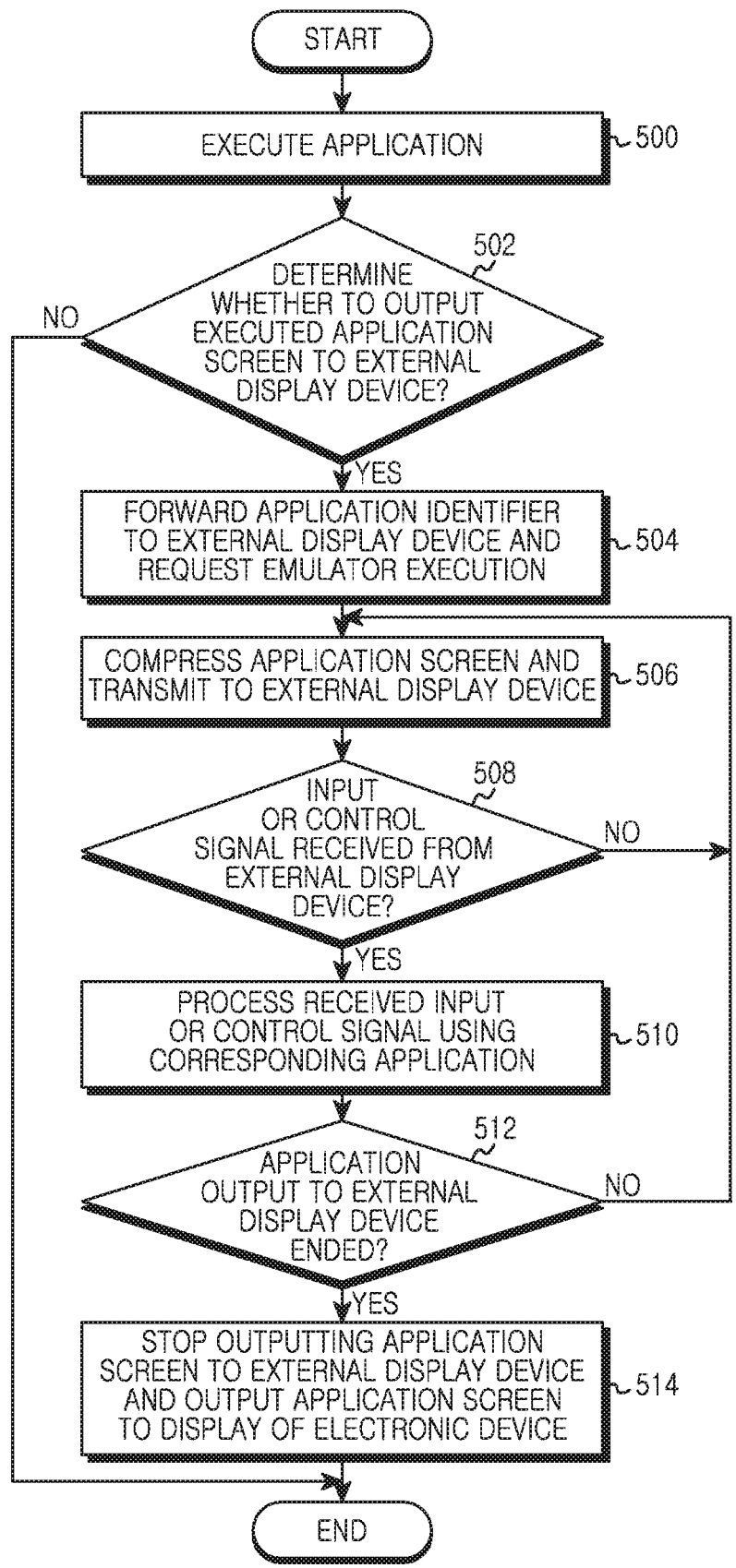
FIG. 5 is a flowchart illustrating a procedure of performing multi-tasking using an external display device in an electronic device according to an embodiment of the present disclosure.

FIG. 5 is a flowchart illustrating a procedure of performing multi-tasking using an external display device in an electronic device according to an embodiment of the present disclosure.

Referring to FIG. 5, at operation 500, the electronic device may execute a specific application. For example, the electronic device may execute a specific application according to a user input.

At operation 502, the electronic device may determine whether to output a screen of the executed specific application to the external display device. For example, the electronic device determines whether the electronic device has been set to an external display device view mode. As an example, hereinafter, a mode of outputting the screen of the specific application of the electronic device to the external display device is referred to as an external display device view mode.

If the electronic device determines not to output a screen of the executed specific application to the external display device at operation 502, then the electronic device may end the procedure of performing multi-tasking using an external display device.

If the electronic device determines to output a screen of the executed specific application to the external display device at operation 502, then the electronic device proceeds to operation 504, at which the electronic device forwards an application identifier to an external display device and requests emulator execution. For example, when the external display device view mode is set for the executed specific application, the electronic device may forward an application identifier of the electronic device to the external display device, and may send a request for emulation execution to an emulator. The emulator may be implemented in hardware or software within the external display device or the electronic device. According to various embodiments of the present disclosure, the application identifier may be randomly determined within the electronic device, or may be allocated and determined by the external display device.

At operation 506, the electronic device may compress the executed specific application screen and may transmit the compressed specific application screen to the external display device. The specific application screen may be periodically compressed and transmitted to the external display device, or may be transmitted to the external display device whenever the specific application screen is changed in accordance with an event.

At operation 508, the electronic device determines whether an input or control signal is received from the external display device.

If the electronic device determines that an input or control signal is not received from the external display device at operation 508, then the electronic device may return to operation 506.

In contrast, if the electronic device determines that an input or control signal is received from the external display device at operation 508, then the electronic device proceeds to operation 510.

At operation 510, the electronic device may process the input or control signal received from the external display device, using the corresponding application. For example, as illustrated in FIG. 2, when the DMB application of the electronic device is displayed in the external display device and a control signal corresponding to a DMB broadcasting channel change is generated (e.g., through selection using an input means such as a touch input, a mouse click, and/or the like in the external display device), the external display device provides the control signal to the electronic device. The electronic device may drive the DMB application in accordance to the control signal received from the external display device and may provide the result to the external display device.

Alternatively, as illustrated in FIG. 3, when the message application of the electronic device is displayed in the external display device and an input signal corresponding to a message input is generated (e.g., through use of an input means such as a touch input, a keyboard input, and/or the like in the external display device), the external display device provides the input signal to the electronic device. The electronic device may drive the message application in response to the input signal received from the external display device and may provide the result to the external display device.

At operation 512, the electronic device determines whether to end outputting the screen of the executed application to the external display device. In other words, the electronic device determines whether the external display device view mode setting for the executed application has been canceled.

If the electronic device determines not to end outputting the screen of the executed application to the external display device at operation 512, then the electronic device may return to operation 506. For example, if the external display device view mode setting for the executed application is not canceled, the electronic device returns to operation 506.

In contrast, if the electronic device determines to end outputting the screen of the executed application to the external display device at operation 512, then the electronic device may proceed to operation 514. For example, if the external display device view mode setting for the specific application is canceled, the electronic device proceeds to operation 514.

At operation 514, the electronic device may stop outputting the specific application screen to the external display device and may send a request for ending the emulator to the external display device. The electronic device may display the specific application screen on a screen of the electronic device.

Thereafter, the electronic device terminates the procedure of the present disclosure.

Figure 6:
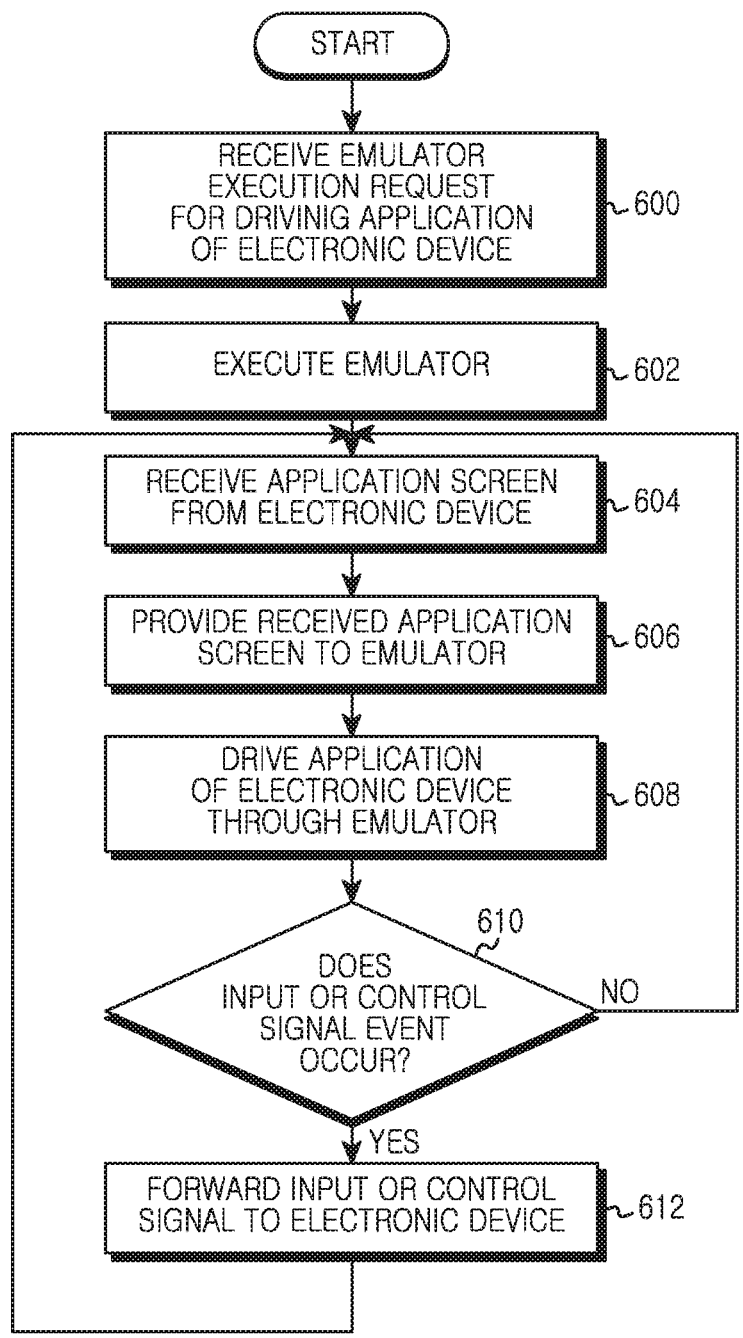
FIG. 6 is a flowchart illustrating a procedure of using in an external display device a plurality of applications of an electronic device according to an embodiment of the present disclosure.

FIG. 6 is a flowchart illustrating a procedure of using in an external display device a plurality of applications of an electronic device according to an embodiment of the present disclosure.

Referring to FIG. 6, at operation 600, the external display device receives from the electronic device an emulator execution request for driving an application of the electronic device.

At operation 602, the external display device executes an emulator. For example, the external display device executes the emulator in response to the emulator execution request of the electronic device.

At operation 604, the external display device receives a signal corresponding to at least one application screen together with an executed application identifier, from the electronic device. If the at least one application screen is compressed and transmitted, the external display device decompresses the at least one application screen through a corresponding image decompression algorithm.

At operation 606, the external display device provides the signal corresponding to the at least one application screen to the emulator.

At operation 608, the external display device may drive the at least one application through the emulator. The external display device may display the at least one application on one screen of the external display device.

At operation 610, the external display device determines whether an input or control signal event occurs. For example, the external display device determines whether an input or control signal is detected.

If the external display device determines that an input or control signal event does not occur at operation 610, then the external display device may return to operation 604.

If the external display device determines that an input or control signal event occurs at operation 610, then the external display device may proceed to operation 612 at which the external display device may forward an input or control signal to the electronic device. For example, if an input or control signal is generated through an input device (e.g., a keyboard, a mouse, a touch input, a remote controller, and/or the like) connected to the external display device at operation 610, then the external display device may proceed to operation 612.

At operation 612, the external display device may forward the input or control signal to the electronic device and thereafter return to operation 604. For example, as illustrated in FIG. 2, when the DMB application of the electronic device is displayed in the external display device and a control signal corresponding to a DMB broadcasting channel change is generated through touch input or mouse click in the external display device, the external display device provides the control signal to the electronic device. The electronic device may drive the DMB application in accordance to the control signal received from the external display device and may provide the result to the external display device.

Alternatively, as illustrated in FIG. 3, when the message application of the electronic device is displayed in the external display device and an input signal corresponding to a message input is generated through touch input or keyboard input in the external display device, the external display device provides the input signal to the electronic device. The electronic device may drive the message application in response to the input signal received from the external display device and may provide the result to the external display device.

Figure 7:
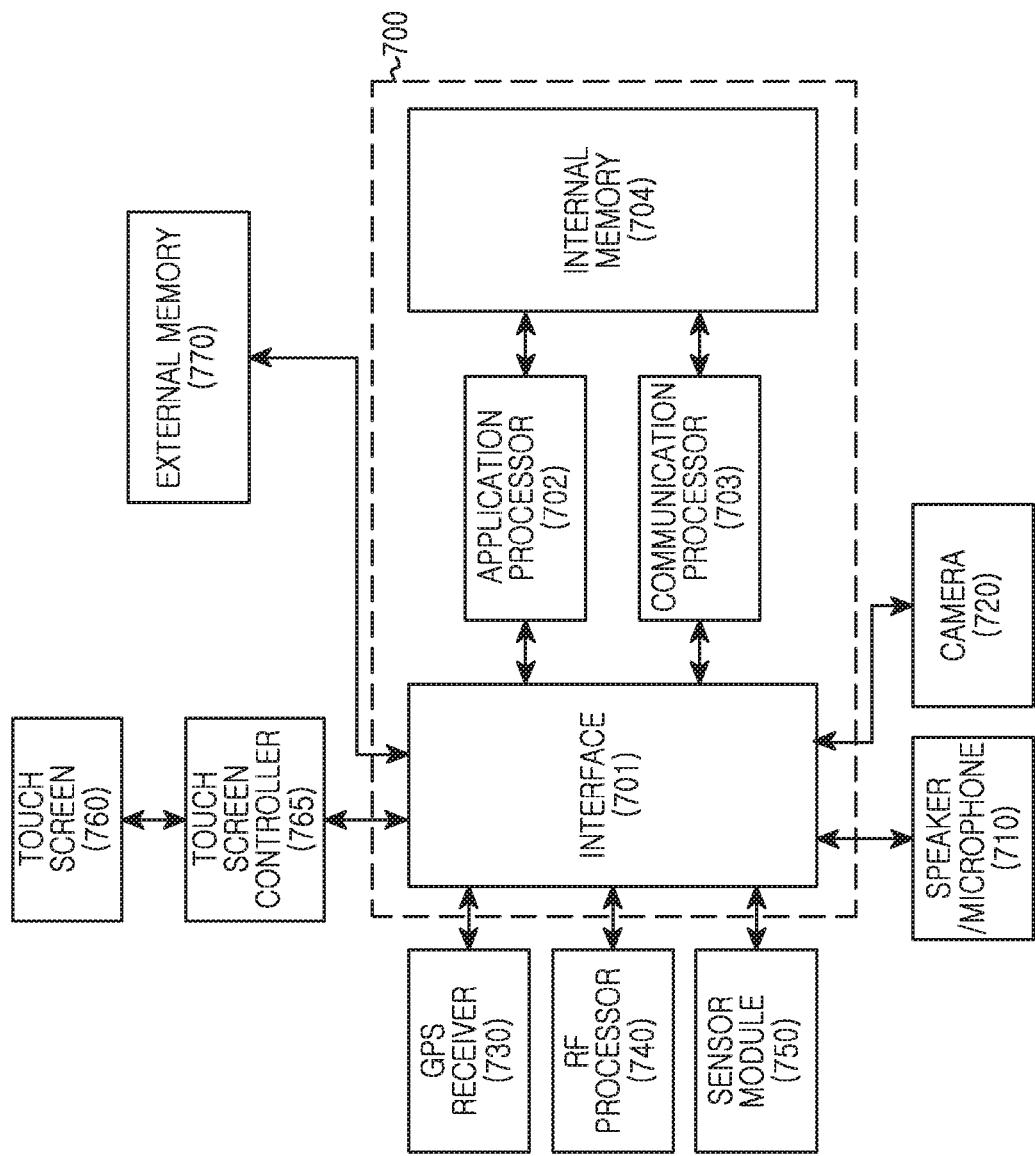
FIG. 7 is a block diagram illustrating a construction of an electronic device according to an embodiment of the present disclosure.

FIG. 7 is a block diagram illustrating a construction of an electronic device according to an embodiment of the present disclosure.

Referring to FIG. 7, the electronic device includes a controller 700, a speaker/microphone 710, a camera 720, a Global Positioning System (GPS) receiver 730, a Radio Frequency (RF) processor 740, a sensor module 750, a touch screen 760, a touch screen controller 765, and an external memory 770.

The controller 700 may include an interface 701, one or more processors (e.g., an application processor 702 and/or a communication processor 703), and an internal memory 704. According to various embodiments of the present disclosure, the whole controller 700 may be called a processor as well. The interface 701, the application processor 702, the communication processor 703, and the internal memory 704 may be separate constituent elements or may be integrated in one or more integrated circuits.

The application processor 702 executes various software programs to perform various functions for the electronic device. The communication processor 703 performs processing and control for voice communication and data communication. In addition, further to this general function, the processors (e.g., the application processor 702 and the communication processor 703) play even a role of executing specific software modules (e.g., instruction sets) stored in the external memory 770 or internal memory 704 to perform specific various functions corresponding to the software modules. For example, the processors (e.g., the application processor 702 and/or the communication processor 703) interwork with software modules stored in the external memory 770 or the internal memory 704 and perform a method of an embodiment of the present disclosure. According to various embodiments of the present disclosure, the application processor 702 may perform a method for performing multi-tasking using the external display device disclosed in FIG. 5.

For example, the application processor 702 executes a specific application by a user input. The application processor 702 determines whether to output a screen of the executed specific application to the external display device (e.g., determines whether the electronic device is set to an external display device view mode. The application processor 702 forwards an application identifier of the electronic device to the external display device when the external display device view mode is set for the executed specific application. The application processor 702 sends a request for emulation execution to an emulator. The application processor 702 compresses the executed specific application screen. The application processor 702 transmits the compressed specific application screen to the external display device. The application processor 702 processes the input or control signal received from the external display device using the corresponding application if an input or control signal is received from the external display device.

For example, as illustrated in FIG. 2, when the DMB application of the electronic device is displayed in the external display device and a control signal corresponding to a DMB broadcasting channel change is generated in the external display device according to an input using an input means (e.g., a touch input, a mouse click, and/or the like), the external display device provides the control signal to the electronic device. The electronic device may drive the DMB application in accordance to the control signal received from the external display device and provide the result to the external display device.

Alternatively, as illustrated in FIG. 3, when the message application of the electronic device is displayed in the external display device and an input signal corresponding to a message input is generated in the external display device according to an input using an input means (e.g., a touch input, a keyboard input, and/or the like), the external display device provides the input signal to the electronic device. The electronic device may drive the message application in response to the input signal received from the external display device and provide the result to the external display device.

Further, the application processor 702 determines whether to end outputting the screen of the executed application to the external display device. For example, the application processor 702 determines whether the external display device view mode setting for the executed application has been canceled, stops outputting the specific application screen to the external display device, and sends a request for ending the emulator to the external display device. The application processor 702 displays the specific application screen on a screen of the electronic device.

The interface 701 is connected to the touch screen controller 765 of the electronic device and the external memory 770 thereof.

The sensor module 750 may be coupled to the interface 701 to enable various functions. For instance, a motion sensor, and/or an optical sensor may be coupled to the interface 701. The motion sensor and/or the optical sensor may respectively detect a motion of the electronic device and light from the exterior. According to various embodiments of the present disclosure, the electronic device may include a positioning system, other sensors such as a temperature sensor, a biological sensor, and/or the like that may be connected to the interface 701 to perform related functions.

The camera 720 may be coupled with the sensor module 750 through the interface 701 to perform a camera function such as photo and video clip recording.

The RF processor 740 performs a communication function. For example, under the control of the communication processor 703, the RF processor 740 converts an RF signal into a baseband signal and provides the baseband signal to the communication processor 703, or converts a baseband signal from the communication processor 703 into an RF signal and transmits the RF signal. The communication processor 703 processes a baseband signal in various communication methods. For example, the communication method can include, though not limited to, a Global System for Mobile Communication (GSM) communication method, an Enhanced Data GSM Environment (EDGE) communication method, a Code Division Multiple Access (CDMA) communication method, a Wireless-Code Division Multiple Access (W-CDMA) communication method, a Long Term Evolution (LTE) communication method, an Orthogonal Frequency Division Multiple Access (OFDMA) communication method, a Wireless Fidelity (Wi-Fi) communication method, a WiMAX communication method, a Bluetooth communication method, and/or the like.

The speaker/microphone 710 may operate input and output of an audio stream, such as voice recognition, voice replication, digital recording, telephone function, and/or the like. For example, the speaker/microphone 710 converts a voice signal into an electrical signal, or converts an electrical signal into a voice signal. Although not illustrated, attachable and detachable ear phone, head phone, head set, and/or the like may be connected to the electronic device through an external port.

The touch screen controller 765 may be coupled to the touch screen 760. The touch screen 760 and the touch screen controller 765 may detect a touch and a motion or an interruption of the touch screen 760 and/or the touch screen controller 765, by using, although not limited to, not only capacitive, resistive, infrared, surface acoustic wave technologies and/or the like for determining one or more touch points with the touch screen 760. The touch screen 760 and the touch screen controller 765 may detect a touch and a motion or an interruption of the touch screen 760 and/or the touch screen controller 765 using any multi-touch sensing (e.g., detecting) technology including other proximity sensor arrays or other elements.

The touch screen 760 provides an input/output interface between the electronic device and a user. For example, the touch screen 760 forwards a user's touch input to the electronic device. In addition, the touch screen 760 is a medium for showing to the user an output of the electronic device. For example, the touch screen 760 shows to the user a visual output. This visual output is displayed in form of a text, a graphic, a video and a combination of them.

The touch screen 760 may use various displays. For instance, the touch screen 760 may use, although not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED) a Flexible LED (FLED), and/or the like.

The GPS receiver 730 converts signals received from three artificial satellites into information of a location, a speed, a time, and/or the like. For instance, the GPS receiver 730 determines distances between the artificial satellites and the GPS receiver 730 through a multiplication of the speed of light and signal arrival time, and obtains accurate locations and distances of the three artificial satellites and measures a location of the electronic device by the known triangulation principle.

The external memory 770 or the internal memory 704 may include high-speed random access memories and/or non-volatile memories such as one or more magnetic disk storage devices, one or more optical storage devices, flash memories (e.g., Not AND (NAND) or Not OR (NOR) memories), and/or the like.

The external memory 770 or the internal memory 704 stores software. A software constituent element includes an Operating System (OS) software module, a communication software module, a graphical software module, a user interface software module, an MPEG module, a camera software module, one or more application software modules, and/or the like. In addition, the module, a software constituent element, may be expressed as a set of instructions. Therefore, the module is also expressed as an instruction set. The module is also expressed as a program.

The OS software includes various software constituent elements controlling general system operation. As an example, the control of the general system operation includes memory management and control, storage hardware (device) control and management, power control and management, and/or the like. The OS software performs even a function of making smooth communication between various hardware (devices) and software constituent elements (modules).

The communication software module enables communication with other electronic devices such as a computer, a server, a portable terminal and/or the like through the RF processor 740. The communication software module may be constructed in a protocol structure corresponding to a corresponding communication method.

The graphical software module includes various software constituent elements for providing and displaying a graphic on the touch screen 760. The term 'graphic' may be used as a meaning including a text, a web page, an icon, a digital image, a video, an animation, and/or the like.

The user interface software module includes various software constituent elements associated with a user interface. The user interface software module includes information about how a state of the user interface is changed, whether the change of the state of the user interface is carried out in which conditions, and/or the like.

The camera software module includes a camera-related software constituent element for enabling camera related processes and functions. The application module includes a browser, an electronic mail (e-mail), an instant message, a word processing, a keyboard emulation, an address book, a touch list, a widget, a Digital Right Management (DRM), a voice recognition, a voice replication, a position determining function, a location based service, and/or the like. The memories 770 and 704 may include additional modules (e.g., instructions) besides the above-mentioned modules. According to various embodiments of the present disclosure, according to need, the memories 770 and 704 may not use some modules (e.g., instructions).

For example, the application module may include instructions of executing a specific application by a user input, determining whether to output a screen of the executed specific application to the external display device (e.g., determining whether the electronic device is set to an external display device view mode, forwarding an application identifier of the electronic device to the external display device when the external display device view mode is set for the executed specific application, sending a request for emulation execution to an emulator, compressing the executed specific application screen and transmitting the compressed specific application screen to the external display device, processing the input or control signal received from the external display device using the corresponding application if an input or control signal is received from the external display device.

For example, as illustrated in FIG. 2, when the DMB application of the electronic device is displayed in the external display device and a control signal corresponding to a DMB broadcasting channel change is generated in the external display device according to an input using an input means (e.g., a touch input, a mouse click, and/or the like), the external display device provides the control signal to the electronic device. The electronic device may drive the DMB application in accordance to the control signal received from the external display device and provide the result to the external display device.

Alternatively, as illustrated in FIG. 3, when the message application of the electronic device is displayed in the external display device and an input signal corresponding to a message input is generated in the external display device according to an input using an input means (e.g., a touch input, keyboard input, and/or the like), the external display device provides the input signal to the electronic device. The electronic device may drive the message application in response to the input signal received from the external display device and provide the result to the external display device.

Further, the application module may further include an instruction of determining whether to end outputting the screen of the executed application to the external display device. For example, the application module may include an instruction of determining whether the external display device view mode setting for the executed application has been canceled. The application module may include an instruction of stopping outputting the specific application screen to the external display device and sending a request for ending the emulator to the external display device. The application module may include an instruction of displaying the specific application screen on a screen of the electronic device.

Figure 8:
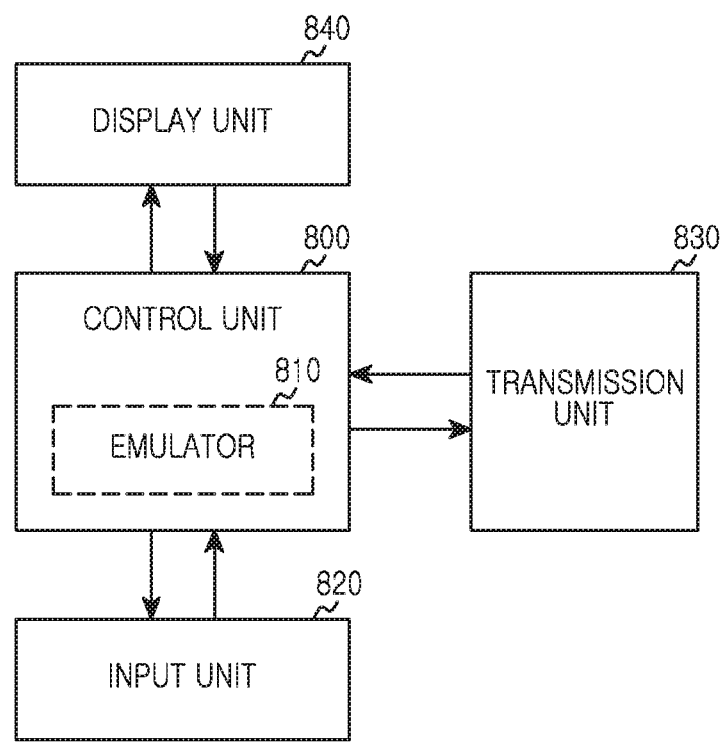
FIG. 8 is a block diagram illustrating a construction of an external display device according to an embodiment of the present disclosure.

FIG. 8 is a block diagram illustrating a construction of an external display device according to an embodiment of the present disclosure.

Referring to FIG. 8, the external display device may include a control unit 800, an input unit 820, a transmission unit 830, and a display unit 840. According to various embodiments of the present disclosure, more function blocks may be added to the external display device.

The transmission unit 830 may receive an emulator execution request for driving an application of the electronic device from an electronic device through a wired or wireless interface. The transmission unit 830 may receive a signal corresponding to at least one application screen together with an application identifier, from the electronic device through a wired or wireless interface.

The control unit 800 performs the general control of the external display device. According to various embodiments of the present disclosure, the control unit 800 executes an emulator 810 in response to the emulator execution request of the electronic device. In addition, when the at least one application screen is compressed and transmitted, the control unit 800 may decompress the at least one application screen through a corresponding image decompression algorithm, provide a signal corresponding to the decompressed at least one application screen to the emulator 810, drive at least one application through the emulator 810, and display the at least one application in the display unit 840.

When an input or control signal is generated through an input unit 820 (e.g., a keyboard, a mouse, a touch input, a remote controller, and/or the like), the control unit 800 forwards the input or control signal to the electronic device. For example, as illustrated in FIG. 2, when the DMB application of the electronic device is displayed in the external display device and a control signal corresponding to a DMB broadcasting channel change is generated through an input (e.g., a touch input, a mouse click, and/or the like) in the external display device, the external display device provides the control signal to the electronic device. The electronic device may drive the DMB application in accordance to the control signal received from the external display device and may provide the result to the external display device.

Alternatively, as illustrated in FIG. 3, when the message application of the electronic device is displayed in the external display device and an input signal corresponding to a message input is generated through an input (e.g., a touch input, a keyboard input, and/or the like) in the external display device, the external display device provides the input signal to the electronic device. The electronic device may drive the message application in response to the input signal received from the external display device and provide the result to the external display device.

Methods according to various embodiments disclosed in claims and/or specification of the present disclosure can be implemented in a form of hardware, software, or a combination of hardware and software.

If the methods are implemented by software, non-transitory a computer-readable storage medium storing one or more programs (e.g., software modules) can be provided. The one or more programs stored in the non-transitory computer-readable storage medium are configured to be executed by one or more processors of an electronic device. The one or more programs can include instructions for enabling the electronic device to execute the methods according to the various embodiments disclosed in the claims and/or specification of the present disclosure.

These programs (e.g., software modules or software) can be stored in a Random Access Memory (RAM), a nonvolatile memory including a flash memory, a Read Only Memory (ROM), an Electrically Erasable Programmable ROM (EEPROM), a magnetic disc storage device, a Compact Disc ROM (CD-ROM), a Digital Versatile Disc (DVD) or an optical storage device of other form, and a magnetic cassette. According to various embodiments of the present disclosure, the programs can be stored in a memory constructed by a combination of some or all of the above identified types of memory. In addition, each constructed memory may be included in plural.

In addition, the programs can be stored in an attachable storage device which is accessible to the electronic device through a communication network such as the Internet, an intranet, a Local Area Network (LAN), a WLAN and a Storage Area Network (SAN) or a communication network constructed by a combination of them. This storage device can access the electronic device through an external port.

In addition, a separate storage device on the communication network may access a portable electronic device.

As described above, various embodiments of the present disclosure can perform multi-tasking conveniently by performing multi-tasking using an external display device in an electronic device. In addition, the various embodiments of the present disclosure can use even in the external display device a plurality of applications used in the electronic device.

Although the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
  a communication processor;
  a display; and
  at least one processor, operatively coupled to the communication processor and the display, configured to:
    receive a request to execute a second application that is installed in the electronic device so that a screen of the second application is provided by an external device,
    when the request is received:
      execute the second application in a background in a state that provides a screen of a first application through the display of the electronic device, and
      transmit data for presenting the screen of the second application through a display of the external device, to the external device in the state,
      receive, in the state, a user input regarding the second application via a peripheral device that is distinct from the external device, and
      transmit, in the state, data for presenting a changed screen of the second application based on the user input through the display of the external device, to the external device.

2. The electronic device of claim 1, wherein the second application is different from the first application and the screen of the second application is not provided through the display of the electronic device in the state.

3. The electronic device of claim 1, wherein the providing of the screen of the first application through the display of the electronic device is restricted by executing the second application in the background.

4. The electronic device of claim 1, wherein the at least one processor is further configured to:
  detect a user input on the screen of the first application, and
  change, independently from executing the second application in the background, a display of the screen of the first application based on the user input on the screen of the first application being presented through the display of the electronic device.

5. The electronic device of claim 1, wherein the at least one processor is further configured to:
  receive the request to execute the second application from the external device through another external device utilized for emulating the second application in the external device,
  transmit the data for presenting the screen of the second application, through the other external device to the external device,
  receive information regarding the user input on the screen of the second application being presented through the display of the external device, from the peripheral device through the other external device, and
  transmit the data for presenting the changed screen of the second application, through the other external device to the external device.

6. The electronic device of claim 1, wherein the screen of the first application is presented through the display of the electronic device by the first application being executed in a foreground distinct from the background.

7. The electronic device of claim 1, wherein the peripheral device comprises an input means for causing the user input.

8. The electronic device of claim 1, wherein the screen of the second application being presented through the display of the external device is maintained until the data for presenting the changed screen of the second application is received at the external device.

9. An electronic device comprising:
  a communication processor;
  a display; and
  at least one processor, operatively coupled to the communication processor and the display, configured to:
    receive a request to execute a second application that is installed in the electronic device so that a screen of the second application is provided by an external device,
    when the request is received, execute the second application in the electronic device,
    when the second application is executed:

present a screen of a first application including at least one object through the display of the electronic device, and transmit, to the external device, data for presenting the screen of the second application including the at least one object through a display of the external device, wherein an arrangement of the at least one object included in the screen of the first application is distinct from an arrangement of the at least one object included in the screen of the second application, receive, while presenting the screen of the first application through the display of the electronic device, a user input regarding the second application via a peripheral device, and based on the user input:

change a display of the screen of the first application being presented through the display of the electronic device, and transmit, to the external device, data for presenting a changed screen of the second application based on the user input through the display of the external device.

10. The electronic device of claim 9, wherein the second application is different from the first application and the screen of the second application is not provided through the display of the electronic device.

11. The electronic device of claim 9, wherein the at least one processor is further configured to:

detect a user input on the screen of the first application being presented through the display of the electronic device, and based on the detected user input, change the display of the screen of the first application and transmit, to the external device, the information for changing the display of the screen of the second application being presented through the display of the external device.

12. The electronic device of claim 9, wherein the at least one processor is further configured to:

receive the request to execute the second application, from the external device through another external device utilized for emulating the second application in the external device, transmit, through the other external device to the external device, the data for presenting the screen of the second application through the display of the external device, receive, from the peripheral device through the other external device, the user input on the screen of the second application being presented through the display of the external device, and transmit, through the other external device to the external device, the data for presenting the changed screen of the second application being presented through the display of the external device.

13. The electronic device of claim 9, wherein the peripheral device comprises an input means for causing the user input on the screen of the second application.

14. The electronic device of claim 9, wherein the at least one processor is further configured to:

in response to receiving the user input on the screen of the second application being presented through the display of the external device from the peripheral device, obtain the data for presenting the changed screen of the second application being presented through the display of the external device based on the user input, and in response to obtaining the data for presenting the changed screen of the second application, transmit the data for presenting the changed screen of the second application to the external device.

15. The electronic device of claim 9, wherein the at least one processor is further configured to transmit, in response to executing the second application, data for outputting audio associated with the screen of the second application via a speaker of the external device, to the external device.

16. An electronic device comprising:

a communication processor; and a processor, operatively coupled to the communication processor, configured to:

receive, from a first external device, a request to execute a second application that is installed in a second external device that is providing a screen of a first application through a display of the second external device, transmit, to the second external device, the received request, receive, from the second external device that is executing the second application in a background state in a state maintaining to present the screen of the first application through the display of the second external device, data for presenting a screen of the second application through a display of the first external device, transmit, to the first external device, the data for presenting the screen of the second application through the display of the first external device, receive, via a peripheral device comprising an input means, a user input on the screen of the second application being presented through the display of the first external device, transmit, to the second external device which is presenting the screen of the first application through the display of the second external device, information regarding the user input on the screen of the second application, receive, from the second external device which is presenting the screen of the first application through the display of the second external device, data for presenting a changed screen of the second application based on the user input, and transmit, to the first external device which is maintaining to present the screen of the second application through the display of the first external device, the data for presenting the changed screen of the second application.

17. The electronic device of claim 16, wherein the presenting of the screen of the second application through the display of the first external device is restricted by executing the second application in the background.

18. The electronic device of claim 16, wherein the screen of the first application is presented through the display of the second external device by the first application being executed in a foreground distinct from the background.

19. The electronic device of claim 16, wherein the second application is different from the first application and the screen of the second application is not provided through the display of the electronic device.

20. The electronic device of claim 16, wherein the screen of the second application being presented through the display of the first external device is maintained until transmitting, by the processor of the electronic device, the data for presenting the changed screen of the second application to the first external device.

* * * * *